United States Patent
Yang et al.

(10) Patent No.: US 10,834,709 B2
(45) Date of Patent: Nov. 10, 2020

(54) METHOD AND APPARATUS FOR TRANSRECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Joonkui Ahn, Seoul (KR); Kijun Kim, Seoul (KR); Eunsun Kim, Seoul (KR); Hyungtae Kim, Seoul (KR); Seonwook Kim, Seoul (KR); Bonghoe Kim, Seoul (KR); Byounghoon Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,601

(22) PCT Filed: Mar. 3, 2017

(86) PCT No.: PCT/KR2017/002336
§ 371 (c)(1),
(2) Date: Dec. 18, 2018

(87) PCT Pub. No.: WO2017/150942
PCT Pub. Date: Sep. 8, 2017

(65) Prior Publication Data
US 2019/0230647 A1     Jul. 25, 2019

Related U.S. Application Data

(60) Provisional application No. 62/446,420, filed on Jan. 14, 2017, provisional application No. 62/367,128, (Continued)

(51) Int. Cl.
*H04W 72/04*    (2009.01)
*H04L 5/00*     (2006.01)
(Continued)

(52) U.S. Cl.
CPC ......... *H04W 72/0413* (2013.01); *H04J 13/18* (2013.01); *H04L 1/1893* (2013.01);
(Continued)

(58) Field of Classification Search
CPC ............. H04W 72/0413; H04L 5/0057; H04L 5/0055; H04L 1/1893; H04L 5/0048;
(Continued)

(56) References Cited

U.S. PATENT DOCUMENTS 8,498,263 B2    7/2013   Chun et al.
2011/0242997 A1 10/2011  Yin
(Continued)

FOREIGN PATENT DOCUMENTS

KR    1020090105789     10/2009
KR    20130073935       7/2013
(Continued)

OTHER PUBLICATIONS

ETRI, "Overview on uplink design for TTI shortening," R1-161012, 3GPP TSG RAN WG1 Meeting #84, Malta, Feb. 15-19, 2016, 4 pages.
(Continued)

*Primary Examiner* — Rina C Pancholi
(74) *Attorney, Agent, or Firm* — Fish & Richardson P.C.

(57) ABSTRACT

The present invention relates to a wireless communication system, and particularly, to a method and an apparatus for same, the method comprising the steps of: generating a UCI; mapping the UCI on an L number of uplink control channel units; and transmitting the mapped UCI, wherein each of the uplink control channel units comprises an Nc number of REs in a single OFDMA symbol, and the plurality of REs include an Nr number of RS transmission REs and an Nd number of (Continued)

UCI transmission REs, wherein Nc is the sum of Nr and Nd, and wherein L is an integer greater than or equal to one and is variable.

20 Claims, 12 Drawing Sheets

Related U.S. Application Data filed on Jul. 27, 2016, provisional application No. 62/353,131, filed on Jun. 22, 2016, provisional application No. 62/316,631, filed on Apr. 1, 2016, provisional application No. 62/313,087, filed on Mar. 24, 2016, provisional application No. 62/309,970, filed on Mar. 18, 2016, provisional application No. 62/303,313, filed on Mar. 3, 2016.

(51) Int. Cl.
  *H04L 27/26* (2006.01)
  *H04J 13/18* (2011.01)
  *H04L 1/18* (2006.01)

(52) U.S. Cl.
  CPC .......... *H04L 5/0048* (2013.01); *H04L 5/0051* (2013.01); *H04L 5/0053* (2013.01); *H04L 5/0055* (2013.01); *H04L 5/0057* (2013.01); *H04L 27/2602* (2013.01); *H04L 5/0007* (2013.01); *H04L 5/0037* (2013.01)

(58) Field of Classification Search
  CPC ... H04L 5/0051; H04L 5/0053; H04L 5/0037; H04L 5/0007; H04L 27/26; H04L 5/0016; H04J 13/18
  See application file for complete search history.

(56) References Cited

U.S. PATENT DOCUMENTS

| | | | | |
|---|---|---|---|---|
| 2016/0100398 A1* | 4/2016 | Xia | .............. | H04L 5/0053 370/330 |
| 2018/0110041 A1* | 4/2018 | Bendlin | ............... | H04L 5/0007 |
| 2018/0212718 A1* | 7/2018 | Takeda | ................. | H04W 24/10 |

FOREIGN PATENT DOCUMENTS

| | | |
|---|---|---|
| KR | 20140140589 | 12/2014 |
| KR | 1020150079939 | 7/2015 |
| KR | 1020150089714 | 8/2015 |

OTHER PUBLICATIONS

Intel Corporation, "Remaining details related to new PUCCH Format," R1-155305, 3GPP TSG-RAN WG1 #82Bis, Malmö, Sweden, Oct. 5-9, 2015, 4 pages.

International Search Report and Written Opinion in International Application No. PCT/KR2017/002336, dated Jun. 1, 2017, 13 pages.

Ericsson, "NB-IoT—CCE mapping," R1-160262, 3GPP TSG-RAN1-RAN1#84, St. Julian, Malta, Feb. 15-19, 2016, 7 pages.

Huawei, HiSilicon, "UCI for NB-IoT," R1-160324, 3GPP TSG RAN WG1 Meeting #84, St Julian's, Malta, Feb. 15-19, 2016, 6 pages.

Huawei, HiSilicon, "Overview of short TTI," RI-156458, 3GPPTSG RAN WGI Meeting #83, Anaheim, USA, Nov. 15-22, 2015, 5 pages, XP051002918.

Intel Corporation, "Uplink Reference Signal Design for Short TTI," R1-160864, 3GPP TSG RAN WG1 Meeting #84, St Julian's, Malta, Feb. 15-19, 2016, 4 pages, XP051054189.

Extended European Search Report in European Application No. 17760346.1, dated Sep. 13, 2019, 11 pages.

Korean Notice of Allowance in Korean Application No. 10-2020-7002095, dated Apr. 27, 2020, 4 pages (with English translation).

* cited by examiner

FIG. 12

| RE index | 0 | 1 | 2 | 3 | 4 | 5 | 6 | 7 | 8 | 9 | 10 | 11 |
|---|---|---|---|---|---|---|---|---|---|---|---|---|
| RE usage | R | D | D | R | D | D | R | D | D | R | D | D |
| Case #1 | C1 | C1 | C1 | C1 | C1 | C1 | C1 | C1 | C1 | C1 | C1 | C1 |
| Case #2 | C1 | C1 | C2 | C1 | C1 | C2 | C1 | C1 | C2 | C1 | C1 | C2 |
| (Case 2-1) | C1 | C1 | C1 | C1 | C2 | C2 | C1 | C1 | C1 | C1 | C2 | C2 |
| (Case 2-1) | C1 | C1 | C1 | C2 | C2 | C2 | C1 | C1 | C1 | C2 | C2 | C2 |
| (Case 2-2) | C1 | C1 | C1 | C1 | C1 | C1 | C1 | C2 | C2 | C1 | C2 | C2 |
| (Case 2-2) | C1 | C1 | C1 | C1 | C1 | C1 | C2 | C2 | C2 | C2 | C2 | C2 |
| Case #3 | C1 | C1 | C2 | C1 | C3 | C4 | C1 | C1 | C2 | C1 | C3 | C4 |
| Case #3 | C1 | C1 | C2 | C2 | C3 | C4 | C1 | C1 | C2 | C2 | C3 | C4 |
| (Case 3-1) | C1 | C1 | C2 | C1 | C1 | C2 | C1 | C3 | C4 | C1 | C3 | C4 |
| (Case 3-1) | C1 | C1 | C2 | C1 | C1 | C2 | C2 | C3 | C4 | C2 | C3 | C4 |
| (Case 3-2) | C1 | C1 | C1 | C1 | C2 | C2 | C1 | C3 | C3 | C1 | C4 | C4 |
| (Case 3-2) | C1 | C1 | C1 | C1 | C2 | C2 | C2 | C3 | C3 | C2 | C4 | C4 |

FIG. 13

| RE index | 0 | 1 | 2 | 3 | 4 | 5 | 6 | 7 | 8 | 9 | 10 | 11 |
|---|---|---|---|---|---|---|---|---|---|---|---|---|
| RE usage | R | D | R | D | R | D | R | D | R | D | R | D |
| Case #1 | C1 | C1 | C1 | C1 | C1 | C1 | C1 | C1 | C1 | C1 | C1 | C1 |
| Case #2 | C1 | C1 | C1 | C2 | C1 | C1 | C1 | C2 | C1 | C1 | C1 | C2 |
| Case #2 | C1 | C1 | C2 | C2 | C1 | C1 | C2 | C2 | C1 | C1 | C2 | C2 |
| (Case 2-1) | C1 | C1 | C1 | C1 | C1 | C1 | C2 | C1 | C2 | C1 | C2 | C2 |
| (Case 2-1) | C1 | C1 | C1 | C1 | C1 | C1 | C2 | C2 | C2 | C2 | C2 | C2 |
| Case #3 | C1 | C1 | C1 | C2 | C1 | C3 | C1 | C1 | C1 | C2 | C1 | C3 |
| Case #3 | C1 | C1 | C2 | C2 | C3 | C3 | C1 | C1 | C2 | C2 | C3 | C3 |
| (Case 3-1) | C1 | C1 | C1 | C1 | C1 | C2 | C1 | C2 | C1 | C3 | C1 | C3 |
| (Case 3-1) | C1 | C1 | C1 | C1 | C2 | C2 | C2 | C2 | C3 | C3 | C3 | C3 |

METHOD AND APPARATUS FOR TRANSRECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2017/002336, filed on Mar. 3, 2017, which claims the benefit of U.S. Provisional Application No. 62/303,313, filed on Mar. 3, 2016, U.S. Provisional Application No. 62/309,970, filed on Mar. 18, 2016, U.S. Provisional Application No. 62/313,087, filed on Mar. 24, 2016, U.S. Provisional Application No. 62/316,631, filed on Apr. 1, 2016, U.S. Provisional Application No. 62/353,131, filed on Jun. 22, 2016, U.S. Provisional Application No. 62/367,128, filed on Jul. 27, 2016, and U.S. Provisional Application No. 62/446,420, filed on Jan. 14, 2017. The disclosures of the prior applications are incorporated by reference in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing communication, which is performed by a user equipment in a wireless communication system, includes the steps of generating UCI (Uplink Control Information), mapping the UCI to the L number of uplink control channel units, and transmitting the mapped UCI. In this case, each of the uplink control channel units is configured by the Nc number of REs (Resource Elements) in a single OFDMA (Orthogonal Frequency Division Multiple Access) symbol, a plurality of the REs include the Nr number of RS transmission REs and the Nd number of UCI transmission REs, the Nc corresponds to the sum of the Nr and the Nd, and the L is an integer equal to or greater than 1 and is variable.

To further achieve these and other advantages and in accordance with the purpose of the present invention, according to a different embodiment, a user equipment in a wireless communication system includes an RF (Radio Frequency) module and a processor, the processor configured to generate UCI (Uplink Control Information), the processor configured to map the UCI to the L number of uplink control channel units, the processor configured to transmit the mapped UCI. In this case, each of the uplink control channel units is configured by the Nc number of REs (Resource Elements) in a single OFDMA (Orthogonal Frequency Division Multiple Access) symbol, a plurality of the REs include the Nr number of RS transmission REs and the Nd number of UCI transmission REs, the Nc corresponds to the sum of the Nr and the Nd, and the L is an integer equal to or greater than 1 and is variable.

Preferably, if the UCI includes HARQ-ACK (Hybrid Automatic Repeat reQuest Acknowledgement) for downlink data, the L can be indicated via downlink control information that schedules the downlink data.

Preferably, each of uplink control channel units constructing the L number of uplink control channel units is separated from each other by the G number of uplink control channel units and the G can be indicated via downlink control information that schedules the downlink data.

Preferably, if the UCI includes CSI (Channel State Information), the L can be differently configured according to whether the CSI is RI (Rank Indication) or CQI/PMI (Channel Quality Information/Precoding Matrix Indicator).

Preferably, UCI symbols of the user equipment can be CDMed (Code Division Multiplexed) on the Nd number of UCI transmission REs using an OCC (Orthogonal Cover Code).

Preferably, each of the uplink control channel units includes a plurality of REGs (RE Groups) and a plurality of REGs can be allocated to user equipments different from each other in a unit of an REG Preferably, the L number of uplink control channel units can be configured in the last OFDMA symbol of a subframe.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 12 illustrates a signal transmission structure according to the present invention.

FIG. 13 illustrates a base station and a user equipment applicable to an embodiment of the present invention.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
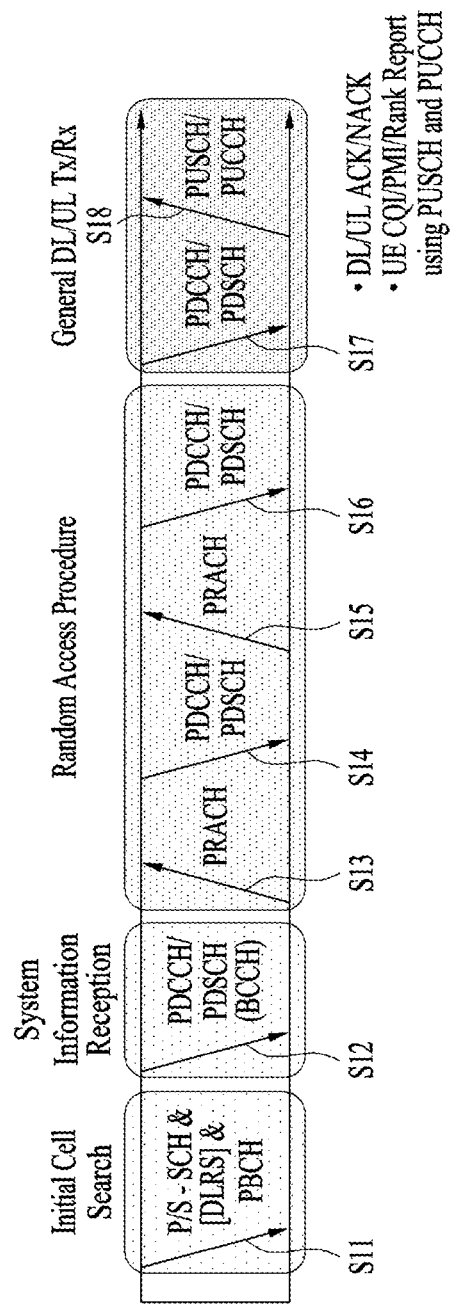
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
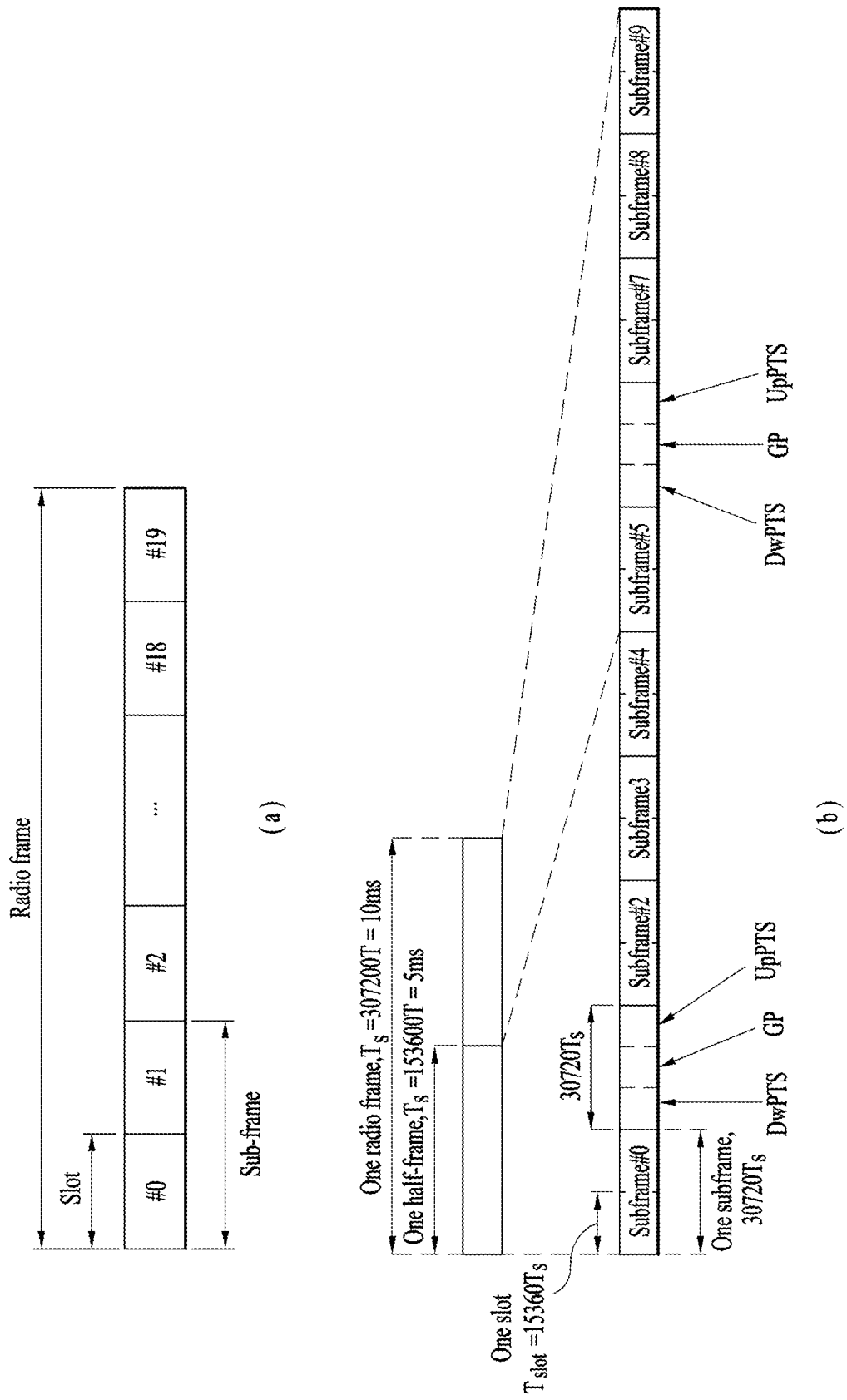
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
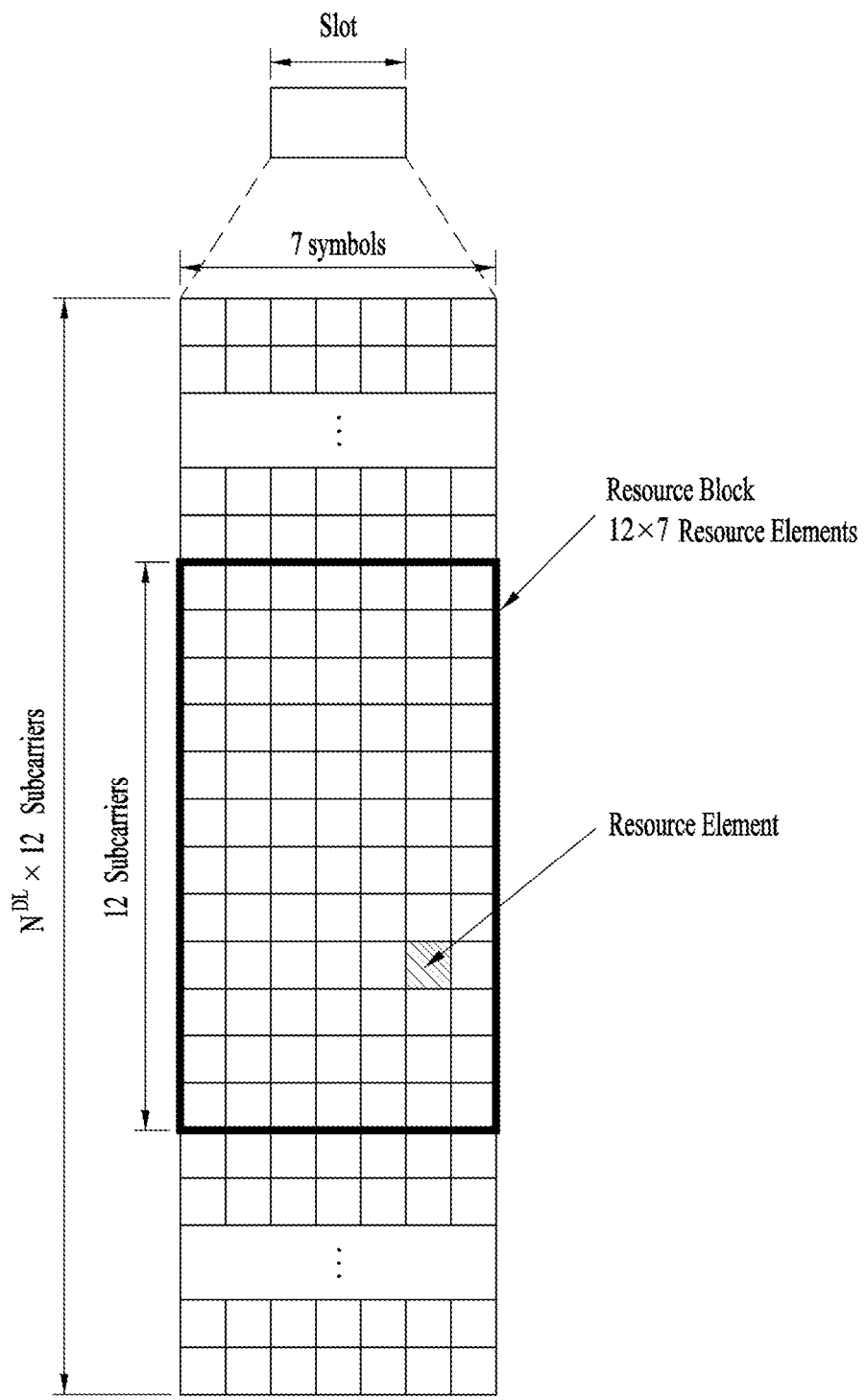
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
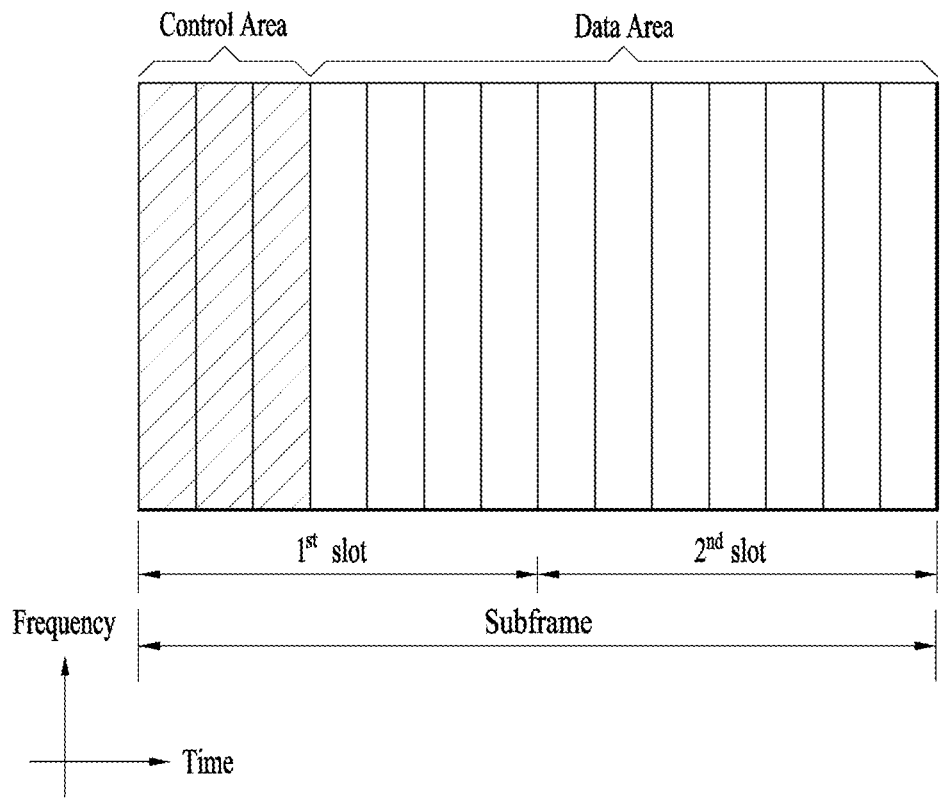
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
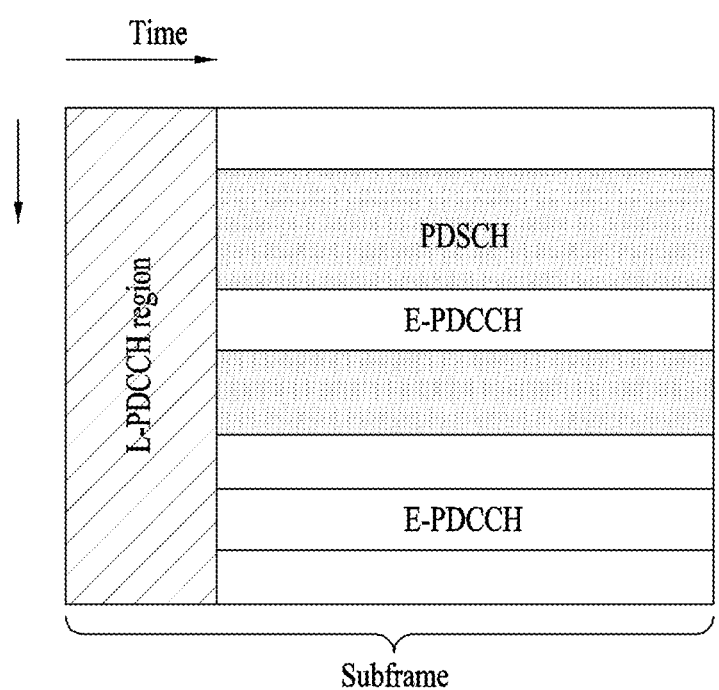
FIG. 5 illustrates an example of an Enhanced Physical Downlink Control Channel (EPDCCH).

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (ports) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
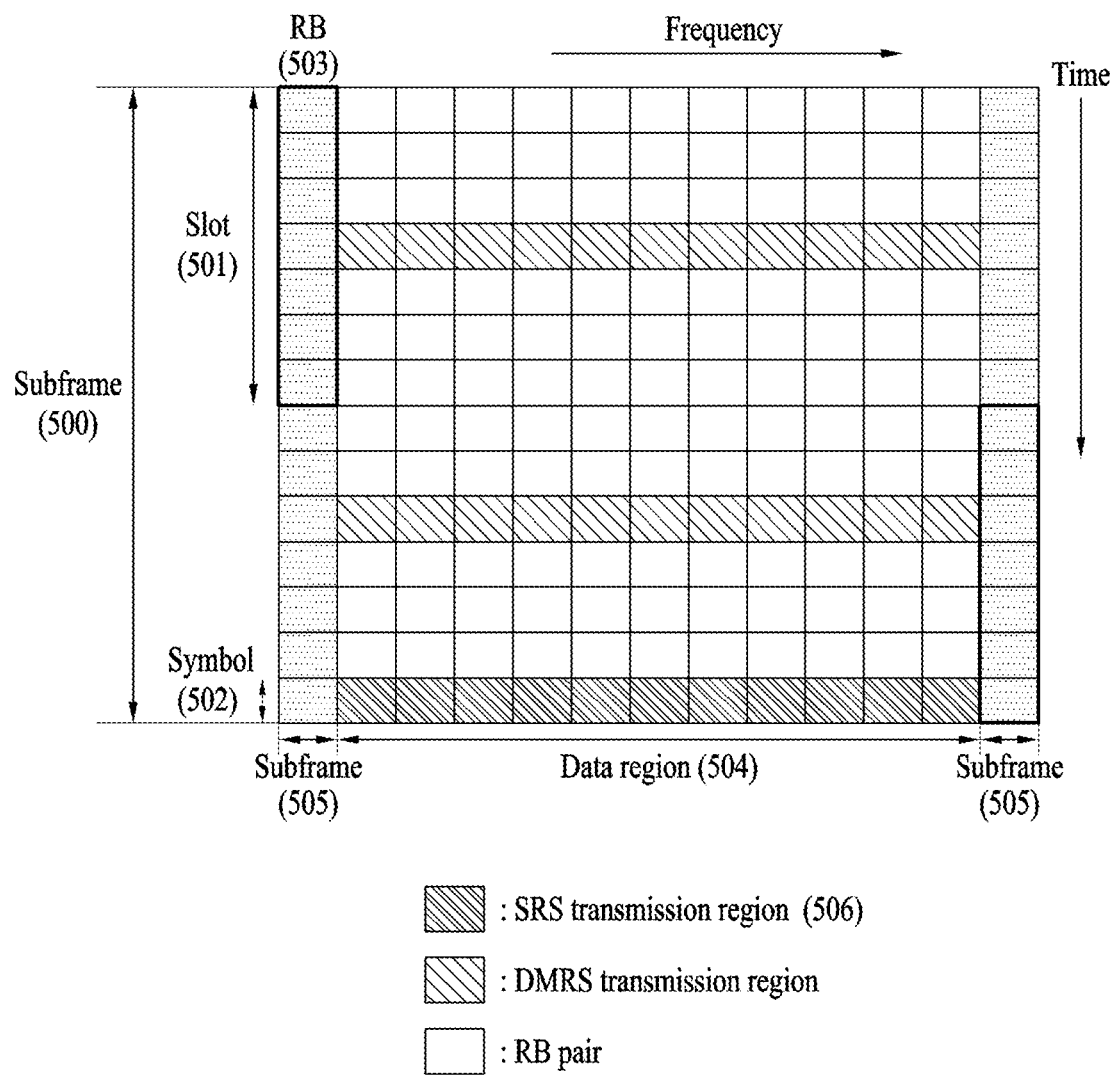
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Next, HARQ (Hybrid Automatic Repeat reQuest) will be described. When a plurality of UEs has data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of a synchronous non-adaptive HARQ method, a retransmission time is appointed in the system (e.g., after 4 subframes from a NACK reception time). Accordingly, the eNB may send a UL grant message to UEs only in initial transmission and subsequent retransmission is performed according to an ACK/NACK signal (e.g., PHICH signal). On the other hand, in the case of an asynchronous adaptive HARQ method, a retransmission time is not appointed and thus the eNB needs to send a retransmission request message to UEs. Further, the retransmission request message may include UE ID, RB allocation information, HARQ process ID/number, RV and NDI information because frequency resources or an MCS for retransmission vary with transmission time.

Figure 7:
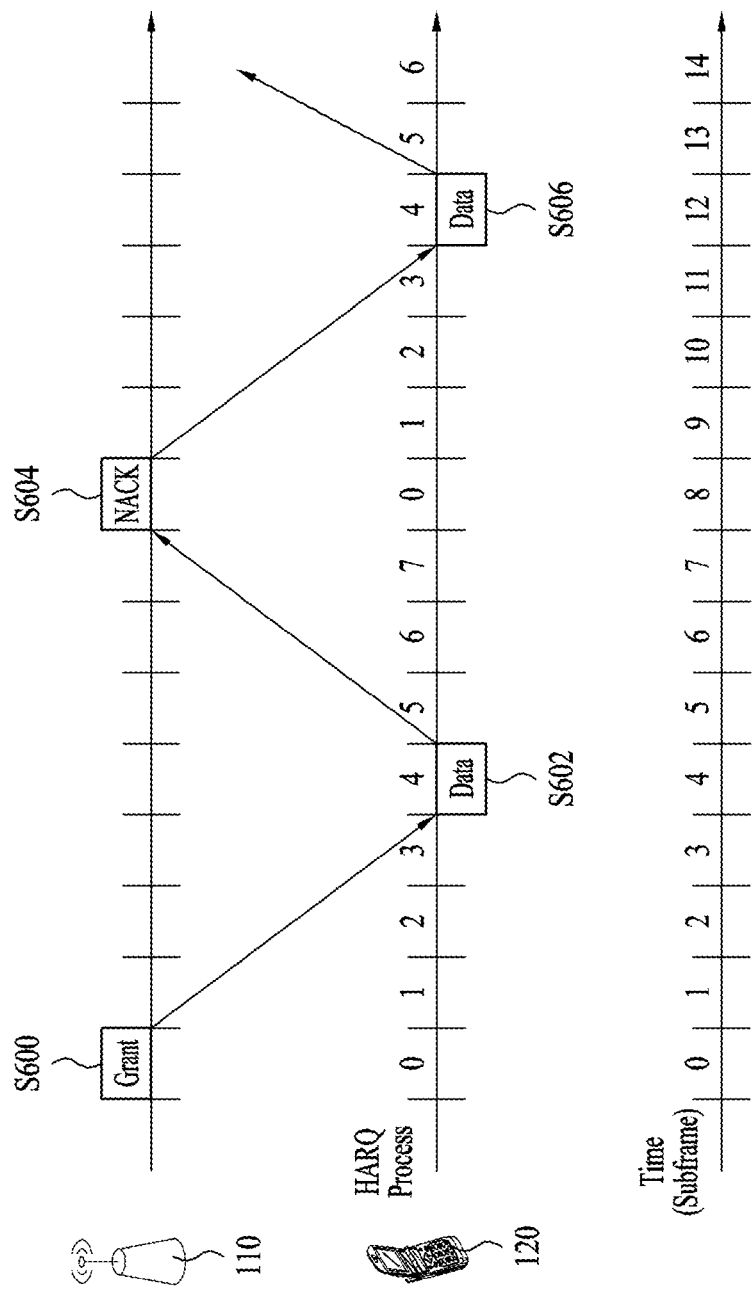
FIG. 7 illustrates UL HARQ (Uplink Hybrid Automatic Repeat reQuest) operation.

FIG. 7 illustrates a UL HARQ operation in an LTE(-A) system. In the LTE(-A) system, the asynchronous adaptive HARQ method is used as a UL HARQ method. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

Figure 8:
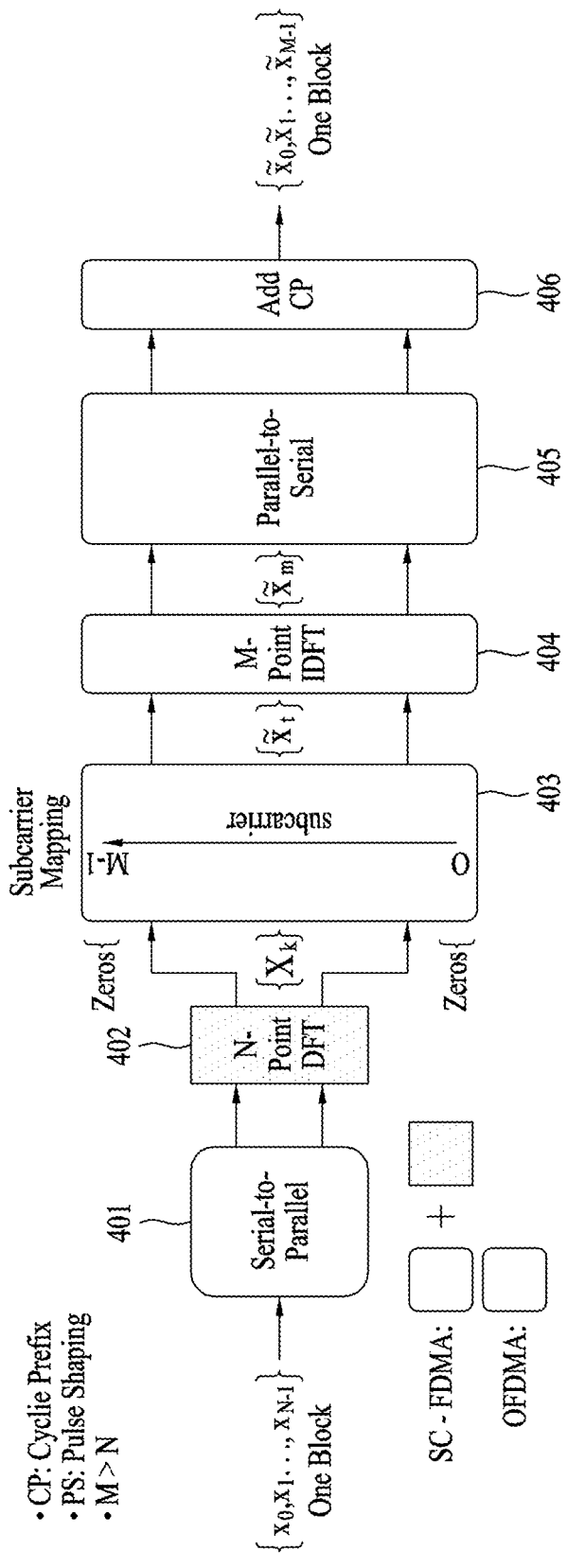
FIG. 8 illustrates Single Carrier Frequency Division Multiple Access (SC-FDMA) scheme and Orthogonal Frequency Division Multiple Access (OFDMA) scheme.

FIG. 8 illustrates SC-FDMA and OFDMA schemes. The 3GPP system employs OFDMA in downlink and uses SC-FDMA in uplink.

Referring to FIG. 8, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Figure 9:
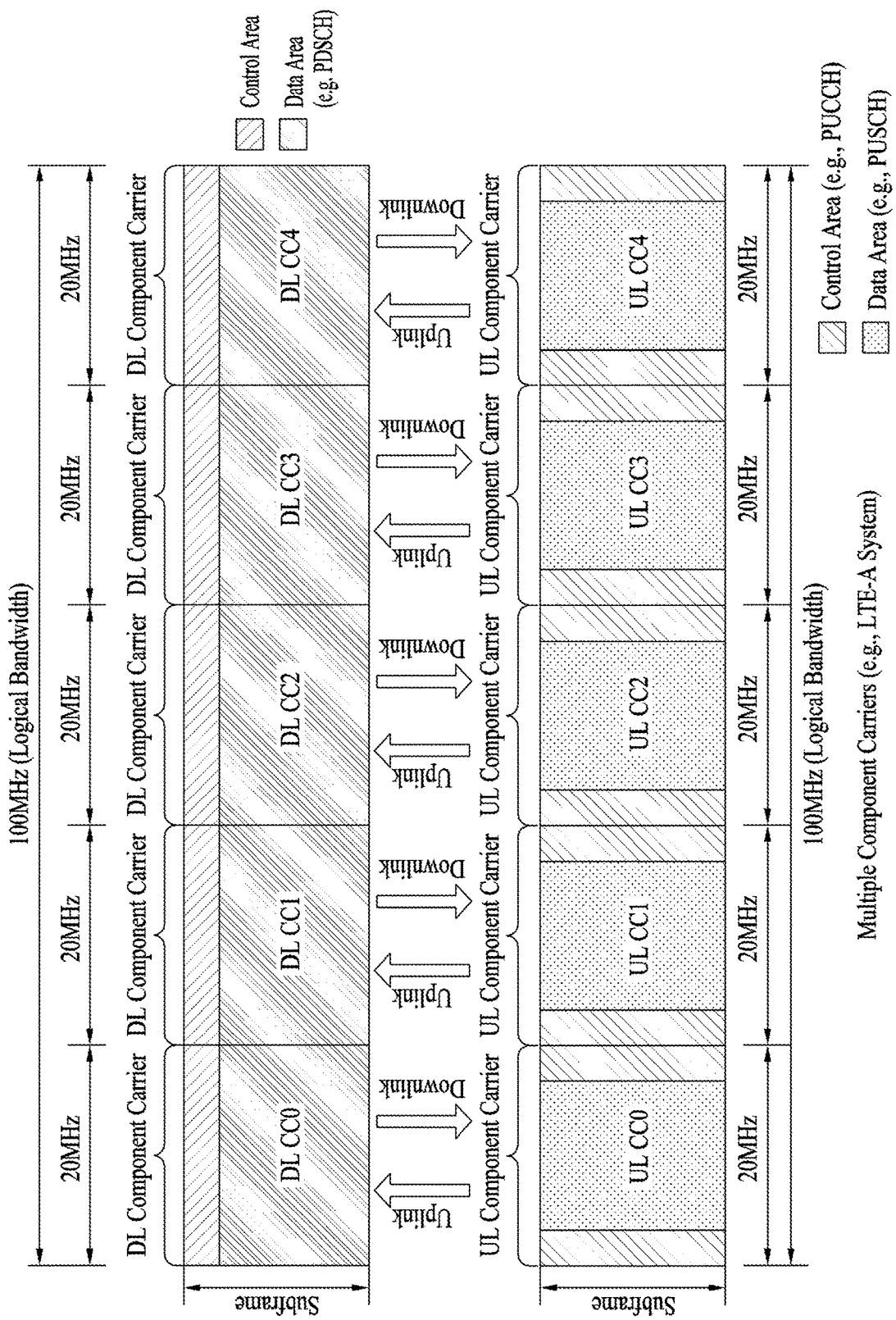
FIG. 9 illustrates a carrier aggregation (CA)-based wireless communication system.

FIG. 9 illustrates carrier aggregation (CA) communication system.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 10:
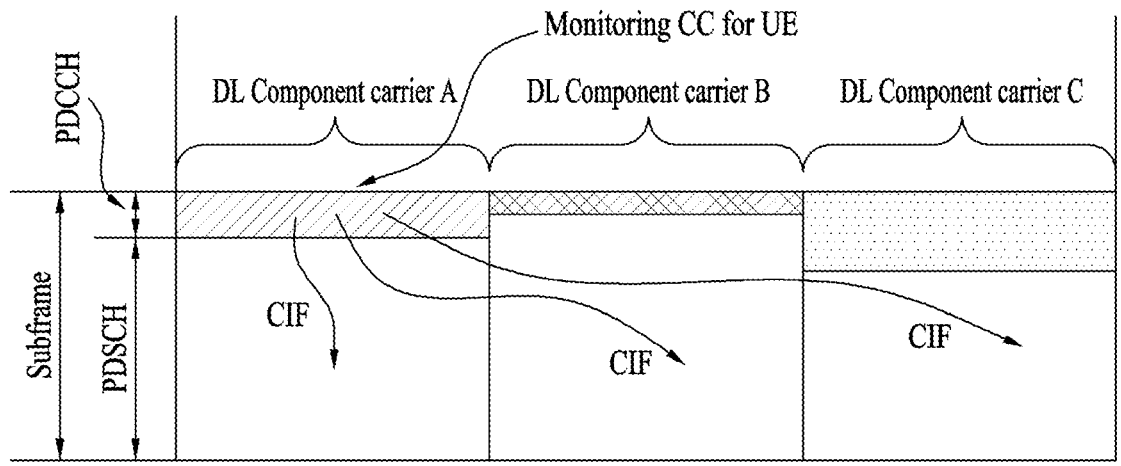
FIG. 10 illustrates cross-carrier scheduling.

FIG. 10 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 11:
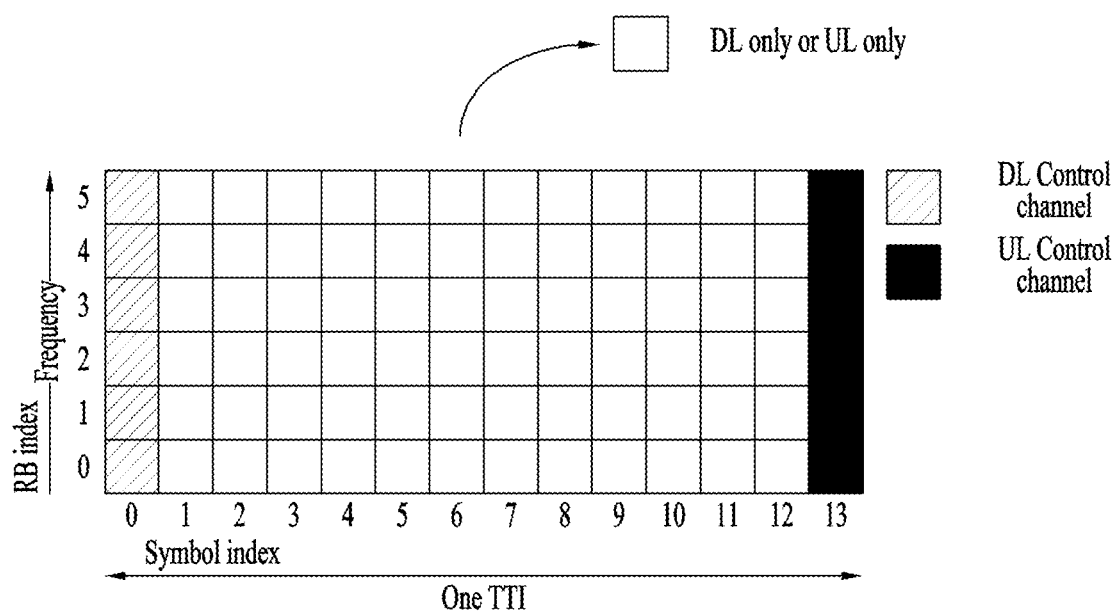
FIG. 11 illustrates a structure of a self-contained subframe.

In next-generation RAT (Radio Access Technology), a self-contained subframe is considered in order to minimize data transmission latency. FIG. 11 illustrates a self-contained subframe structure. In FIG. 11, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment

Unlike a legacy LTE system operating based on a fixed DL/UL SF configuration, in a new RAT system, it may consider an operation of dynamically changing a DL/UL resource (e.g., data region) portion in a single SF or a DL/UL resource portion in a plurality of subframes according to a DL/UL traffic status based on a self-contained SF type shown in FIG. 11 (i.e., dynamic TDD). Meanwhile, as shown in FIG. 11, a self-contained SF type may have a structure that a UL control channel is transmitted in a manner of being TDM with a DL data channel or a UL data channel in a single SF (while occupying one or the small number of symbol periods) in consideration of latency reduction for data (e.g., DL data) transmission. The present invention proposes a UL control channel structure for a new RAT system operating based on a self-contained SF type and a transmission method. In the following description, a symbol includes OFDMA-based symbols (e.g., OFDM(A) symbol, SC-FDM(A) symbol).

UL CCE Unit Based UL Control Channel Structure

In the present invention, a UL control channel structure can be configured in a unit of a set of specific UL REs (hereinafter, UL CCE (Control Channel Element) (simply, CCE)) as a base unit. One CCE can be configured in a manner of including an RS transmitting RE (hereinafter, RS RE) and a data transmitting RE (hereinafter, data RE). In particular, if the total number of REs constructing a single CCE is defined as Nc, the number of RS REs belonging to a CCE is defined as Nr, and the number of data REs belonging to a CCE is defined as Nd, it can be represented as, Nc=Nr+Nd. Meanwhile, the RS RE can be arranged to the Nr number of REs (of the same spacing) having the maximum spacing from each other (considering application of cyclic shifts as well) in a single CCE, and the data RE can be arranged to the remaining Nd number of REs except the RS RE. For example, when the entire REs are configured so that an RE ratio of (RS:data) per CCE (K=1) corresponds to (1:K), a spacing between adjacent RS REs in a CCE can be configured by (K+1) RE. Or, the RS RE can be arranged to the Nr/Na number of RE groups (of the same spacing) having the maximum spacing from each other (considering application of cyclic shifts as well) in a single CCE and each of the RE groups can be configured by the Na number of REs adjacent to each other. Meanwhile, the number (Nc) of REs constructing a CCE can be defined/configured to be identical/different to/from the number (e.g., 12) of REs constructing a minimum resource unit (e.g., RB) used for allocating a resource for DL/UL data scheduling. Meanwhile, such terms as a UL CCE (resource or index) and a UL control channel (resource or index) can be interchanged in the present invention.

When a UL control channel is transmitted, UCIs of a plurality of UEs or UCIs different from each other of the same UE may use a different RE in the same UL CCE (FDM) and/or use a different OCC (Orthogonal Cover Code) (in the same RE set) (CDM). Meanwhile, a single UL CCE can be configured as follows. Alt 1) A UL CCE is configured by a plurality of REs (having a different RE index) only in an OFDM (or SC-FDM) symbol (i.e., configured by a plurality of frequency resources of a single symbol). Alt 2) A UL CCE is configured by a plurality of REs having the same RE index in a plurality of OFDM (SC-FDM) symbols (i.e., configured by the same frequency resources of a plurality of symbols). Alt 3) A UL CCE is configured by REs in a plurality of OFDM (SC-FDM) symbol periods and a plurality of frequency (RE) sections. Based on this, the different number of UL CCEs can be allocated to a UE according to the number of UCI bits (e.g., UCI type) or UL coverage of a UE. Hence, the number of UL CCEs used for transmitting a single UL control channel at a UE may vary according to a UCI type or UL coverage. For example, a single CCE is allocated to a UCI type configured with small bits such as HARQ-ACK feedback for DL data reception, SR transmission, and the like, and a plurality of CCEs can be allocated to a UCI type configured with large bits such as (periodic) CSI feedback, and the like. As a different example, if a UE is in a bad coverage status, it may be able to allocate a plurality of CCEs (configured in different symbols) to a UCI type such as HARQ-ACK, SR, and the like. Meanwhile, a UCI bit (e.g., mapped/transmitted to an RE) described in the present invention can be replaced with a modulation symbol for a UCI bit (e.g., QPSK or 16-QAM symbol) or a modulation symbol for a coded bit of UCI.

UL control channel configuration based on Alt 1 is explained in the following. FIG. 12 illustrates an application example when Nc corresponds to 12, Nr corresponds to 4, and Nd corresponds to 8. Referring to FIG. 12, since an RE ratio (1:K) of (RS:data) is given by (1:2), a spacing between RS REs can be configured by (K+1)=3 REs. In FIG. 12, R denotes an RS RE, D denotes a data RE, and C denotes an OCC. R set or D set corresponding to Cn expressed by the same number n corresponds to an RE set to which a single code sequence is applied (e.g., multiplied). In particular, the R set or the D set corresponding to the Cn expressed by the same number n corresponds to an RE set to which CDM is applied. In order to apply CDM, all REs belonging to the R set or the D set corresponding to the Cn may have the same value/information and each element of a code sequence can be multiplied by information (e.g., modulation symbol) mapped to a corresponding RE belonging to the R set or the D set by one-to-one (1:1). It may be able to additionally apply scrambling to the R set or the D set corresponding to the Cn.

In case of a case #1, an OCC of length-4 is applied over 4 RS REs and an OCC of length-8 can be applied over 8 data REs. In this case, the same UCI bit (of the same UE) can be mapped/transmitted to 8 data REs. For example, the OCC of length-4 can include 4 code sequences: C1=[a1 a2 a3 a4] ⊃ {[+1, +1, +1, +1], [+1, −1, +1, −1], [+1, +1, −1, −1], [+1, −1, −1, +1]}. In case of considering a complex sequence, the OCC of length-4 can be configured by 8 code sequences. In this case, an RS modulation symbol (or RS sequence element) of an RE index 0/3/6/9 can be multiplied by a1 a2 a3 a4, respectively. A modulation symbol of the RE index 0/3/6/9 may have the same value/information. In particular, 4 (or 8) different RSs can be multiplexed with 4 RS REs. The OCC of length-8 can be identically applied to a data RE of an RE index 1/2/4/5/7/8/10/11. In this case, 8 (or 16) UCI modulation symbols can be multiplexed on 8 data REs via CDM.

In case of a case #2, an OCC of length-4 is applied over 4 RS REs, and an OCC of length-4 can be applied over 4 data REs (i.e., data REG (RE group)) having an interval of 3 REs. In this case, UCIs of different UEs or different UCI bits of the same UE can be mapped/transmitted to different data REGs. For example, referring to FIG. 12, 4 data REs corresponding to RE indexes 1/4/7/10 (to which C1 is applied) configure a data REG; and 4 data REs corresponding to RE indexes 2/5/8/11 (to which C2 is applied) can configure a different data REG In this case, if it is configured to map/transmit UCIs of different UEs to different REGs d, each UE can perform UCI transmission using a single data REG only (with 4 RS REs). 4 (or 8) UCI modulation symbols can be multiplexed on one data REG via CDM.

In case of a case #3, Opt 1) an OCC of length-4 is applied over 4 RS REs, or Opt 2) an OCC of length-2 can be applied over 2 RS REs (i.e., RS REG) having an interval of 6 REs. In FIG. 12, a first case #3 illustrates the Opt 1 and a second case #3 illustrates the Opt 2. Referring to the second case #3, two RS REs corresponding to an RE index 0/6 (to which C1 is applied) configure one RS REG and two RS REs corresponding to an RE index 3/9 (to which C2 is applied) can configure another RS REG And, an OCC of length-2 can be applied over 2 data REs having an interval of 6 REs. UCIs of different UEs or different UCI bits of the same UE can be mapped/transmitted on different data REGs.

In case of the case #3, if UCIs of different UEs are configured to be mapped/transmitted on different data REGs, each of the UEs can perform UCI transmission using (Opt 1 based 4 RS REs and a single data REG) or (Opt 2 based single RS REG and a single data REG). In this case, a data REG can configure a UL control channel in a manner of being combined with a single RS REG While the data REG is adjacent to a corresponding RS RE index, the data REG can be configured Opt A) by including the K number of data REs having a low RE index, Opt B) by including the K number of data REs having a high RE index, or Opt C) by including the K number of data REs corresponding to the K/2 number of data REs of a low RE index and the K/2 number of data REs of a high RE index. If it is assumed that the Opt A is applied, in the second case #3 of FIG. 12, an RS REG corresponding to an RE index 0/6 is combined with two data REGs corresponding to an RE index 10 (previous CCE)/4 and an RE index 11 (previous CCE)/5 and an RS REG corresponding to an RE index 3/9 can be combined with two data REGs corresponding to an RE index 1/7 and an RE index 2/8. If it is assumed that the Opt B is applied, in the second case #3 of FIG. 12, an RS REG corresponding to an RE index 0/6 is combined with two data REGs corresponding to an RE index 1/7 and an RE index 2/8 and an RS REG corresponding to an RE index 3/9 can be combined with two data REGs corresponding to an RE index 4/10 and an RE index 5/11. If it is assumed that the Opt C is applied, in the second case #3 of FIG. 12, an RS REG corresponding to an RE index 0/6 is combined with two data REGs corresponding to an RE index 11 (previous CCE)/5 and an RE index 1/7 and an RS REG corresponding to an RE index 3/9 can be combined with two data REGs corresponding to an RE index 2/8 and an RE index 4/10.

In addition, with extending the UL control channel configuration principle mentioned earlier in the case #2 and the case #3, it is able to configure an RS RE and a data RE using the methods mentioned earlier in case 2-1, case 2-2, case 3-1, and case 3-2.

FIG. 13 illustrates an application example when Nc corresponds to 12, Nr corresponds to 6, and Nd corresponds to 6. Referring to FIG. 13, since an RE ratio (1:K) of (RS:data) is given by (1:1), a spacing between RS REs can be configured by (K+1)=2. In FIG. 13, R denotes an RS RE, D denotes a data RE, and C denotes an OCC.

In case of a case #1, an OCC of length-6 is applied over 6 RS REs and an OCC of length-6 can be applied over 6 data REs. In this case, the same UCI bit (of the same UE) can be mapped/transmitted to 6 data REs.

In case of a case #2, Opt 1) an OCC of length-6 is applied over 6 RS REs or Opt 2) an OCC of length-3 can be applied over 3 RS REs (i.e., RS REG) having an interval of 4 REs. And, it may apply an OCC of length-3 over 3 data REs having an interval of 4 REs. UCIs of different UEs or different UCI bits of the same UE can be mapped/transmitted on different data REGs. If UCIs of different UEs are configured to be mapped/transmitted on different data REGs, each of the UEs can perform UCI transmission using (Opt 1 based 6 RS REs and a single data REG) or (Opt 2 based single RS REG and a single data REG). In this case, a data REG; which configures a UL control channel in a manner of being combined with an RS REG; can be configured as a data REG that includes K number of data REs having a low RE index and/or a high RE index adjacent to a corresponding RS RE index.

In case of a case #3, Opt 1) an OCC of length-6 is applied over 6 RS REs or Opt 2) an OCC of length-2 can be applied over 2 RS REs (i.e., RS REG) having an interval of 6 REs. And, it may apply an OCC of length-2 over 2 data REs having an interval of 6 REs. UCIs of different UEs or different UCI bits of the same UE can be mapped/transmitted on different data REGs. If UCIs of different UEs are configured to be mapped/transmitted on different data REGs, each of the UEs can perform UCI transmission using (Opt 1 based 6 RS REs and a single data REG) or (Opt 2 based single RS REG and a single data REG). In this case, a data REG; which configures a UL control channel in a manner of being combined with an RS REG; can be configured as a data REG that includes K number of data REs having a low RE index and/or a high RE index adjacent to a corresponding RS RE index.

In addition, with extending the UL control channel configuration principle mentioned earlier in the case #2 and the case #3, it is able to configure an RS RE and a data RE using the methods mentioned earlier in case 2-1, case 2-2 and case 3-1 of FIG. 13.

Meanwhile, according to the present invention, a plurality of REs constructing a single UL CCE can be contiguously or non-contiguously arranged (on an RE index). Although REs constructing a UL CCE are non-contiguously arranged, it may be able to restrict that an RS RE and a data RE, which is modulated via channel estimation based on the RS RE, are arranged so to be adjacent to each other. And, (in a state that a plurality of REs constructing a single CCE are contiguously arranged (on an RE index)), a plurality of UL CCEs constructing a single UL control channel can be contiguously or non-contiguously arranged (on an RE index or a CCE index).

Referring to FIG. 12, when 6 RS/data REs (i.e., REG) corresponding to RE indexes 0/1/2/3/4/5 are adjacently arranged and when 6 RS/data REs (i.e., REG) corresponding to RE indexes 6/7/8/9/10/11 are adjacently arranged, two REGs can be non-contiguously arranged. As a different example, when there are an REG corresponding to RE indexes 0/1/2, an REG corresponding to RE indexes 3/4/5, an REG corresponding to RE indexes 6/7/8, and an REG corresponding to RE indexes 9/10/11 and REs belonging to each single REG are adjacently arranged, the REGs can be non-contiguously arranged. Referring to FIG. 13, when there are an REG corresponding to RE indexes 0/1/2/3/4/5 and an REG corresponding to RE indexes 6/7/8/9/10/11 and REs belonging to each single REG are adjacently arranged, the REGs can be non-contiguously arranged. As a different example, when there are an REG corresponding to RE indexes 0/1/2/3, an REG corresponding to RE indexes 4/5/6/7, and an REG corresponding to RE indexes 8/9/10/11, and 4 REs belonging to each single REG are adjacently arranged, the 3 REGs can be non-contiguously arranged. As a further different example, when there are an REG corresponding to RE indexes 0/1, an REG corresponding to RE indexes 2/3, an REG corresponding to RE indexes 4/5, an REG corresponding to RE indexes 6/7, an REG corresponding to RE indexes 8/9, and an REG corresponding to RE indexes 10/11, and 2 REs belonging to each single REG are adjacently arranged, the 6 REGs can be non-contiguously arranged.

Meanwhile, in the foregoing description, although the total number of REs constructing a UL CCE is illustrated by Nc=12 for convenience, by which the present invention may be non-limited. Nc can be defined/configured by a multiple of 12 such as 24 or 36. Or, Nc can be defined/configured by a multiple of 6 such as 6, 18, or 30. For example, when the Nc corresponds to 24, if an RE ratio (1:K) of (RS:data) is configured by (1:2) (i.e., Nr=8, Nd=16), an interval between RS REs can be set to (K+1)=3 REs. In this case, it may be able to apply OCC-based CDM to RS/data using a method similar to FIG. 12. Or, when the Nc corresponds to 24, if an RE ratio (1:K) of (RS:data) is configured by (1:1) (i.e., Nr=12, Nd=12), an interval between RS REs can be set to (K+1)=2 REs. In this case, it may be able to apply OCC-based CDM to RS/data using a method similar to FIG. 13. As a different example, when the Nc corresponds to 18, if an RE ratio (1:K) of (RS:data) is configured by (1:2) (i.e., Nr=6, Nd=12), an interval between RS REs can be set to (K+1)=3 REs. In this case, it may be able to apply OCC-based CDM to RS/data using a method similar to FIG. 12. Or, when the Nc corresponds to 18, if an RE ratio (1:K) of (RS:data) is configured by (1:1) (i.e., Nr=9, Nd=9), an interval between RS REs can be set to (K+1)=2 REs. In this case, it may be able to apply OCC-based CDM to RS/data using a method similar to FIG. 13.

Meanwhile, a single UL CCE can be configured by REs belonging to a single OFDM (or SC-FDM) symbol only. When a position of a section in which a UL control channel is transmitted in a self-contained SF type is considered, it may be able to configure a lower CCE or a lower UC-CH index to be mapped to a UL control channel (i.e., UC-CH) index configured by either a CCE index or one or more CCEs from the last symbol of the SF. For example, if it is assumed that a single SF is configured by Ns number of symbols, it is able to perform UL CCE indexing or UC-CH resource indexing in a manner that a CCE or a UC-CH index 0~(K−1) is mapped to an $Ns^{th}$ symbol (i.e., last symbol) and a CCE or a UC-CH index K<(2K−1) is mapped to an $(Ns−1)^{th}$ symbol. In this case, in case of considering an implicit UL control channel resource allocation method linked with a DL control channel resource (e.g., DL CCE) or a DL data channel resource (e.g., DL PRB), it may consider a method of linking a (UL CCE or UL-CH) with a (DL CCE or DL PRB) having the same index or a method of linking a (UL CCE or UL-CH) of a low (high) index with a (DL CCE or DL PRB) of a low (high) index. If the DL CCE or the DL PRB corresponds to a plural number, a first DL CCE or a first DL PRB can be used for allocating a UL channel resource.

Meanwhile, in case of the Alt 1 based method mentioned earlier in FIGS. 12 and 13, it may apply an offset to an RE index to which an RS is arranged within a UL CCE. For example, in FIG. 12, a (starting) RE index to which an RS is arranged is configured by one selected from among 0, 1, and 2. In FIG. 13, a (starting) RE index to which an RS is arranged can be configured by one of 0 and 1.

In FIGS. 12 and 13, it may be able to apply the Alt 2 by replacing REs with a plurality of REs having the same RE index within the Nc number of symbols (i.e., by replacing RE indexes with symbol indexes in FIGS. 12 and 13). In this case, it may also apply an offset to a symbol index to which an RS is arranged within a CCE. For example, in FIG. 12, a (starting) RE index to which an RS is arranged is configured by one selected from among 0, 1, and 2. In FIG. 13, a (starting) RE index to which an RS is arranged can be configured by one of 0 and 1. The RE/OCC allocation and the UCI mapping principle of the Alt 1 can be similarly applied to Alt 2.

In case of Alt 3, in FIGS. 12 and 13, when an RS RE and a data RE (e.g., RE indexes 0/1/2 in FIG. 12 and RE indexes 0/1 in FIG. 13) adjacent to the RS RE are defined as a single REG it may consider a structure Opt 1) while a single UL CCE is configured by a plurality of symbols, a single REG is configured only in each of a plurality of the symbols and Opt 2) while a single UL CCE is configured by a plurality of symbols, a plurality of same REGs are configured in each of a plurality of the symbols. In this case, it may also apply an offset to an RE index to which an RS is arranged within each of a plurality of symbols that construct a CCE. It is able to apply the same offset value to all symbols constructing a CCE or apply a different offset value according to a symbol in accordance with time/frequency selectivity of a radio channel. Meanwhile, the RE/OCC allocation and the UCI mapping principle of the Alt 1 can be similarly applied to Alt 3.

Meanwhile, it may be able to configure the entire REs (k=1) to make an RE ratio of (RS:data) per single UL CCE to be (K:1) in consideration of a case that time/frequency selectivity is very high due to UE mobility and/or channel delay spread. Or, as an extreme case, it may be able to configure the entire REs to map/transmit only an RS on all REs within a CCE without data (or by allocating a specific sequence). In the latter case, it may consider an operation of transmitting/detecting specific information (e.g., 1-bit information) (e.g., SR) according to whether or not a CCE is transmitted (e.g., ON/OFF keying scheme). As a different method for the latter case, it may consider an operation of transmitting/detecting N-bit information in a manner of allocating the $2^N$ number of RSs (sequences) orthogonal to each other to a single UL CCE and selecting/transmitting a single RS (sequence) selected from among the $2^N$ number of RSs. For example, when two RSs (sequences) are allocated, it is able to transmit/detect 1-bit information (e.g., ACK/NACK) depending on which RS is selected/transmitted from among the two RSs. It may be able to configure RSs (sequences) orthogonal to each other by differently configuring a frequency resource, a time resource, and the like on which an RS (sequence) is mapped/transmitted. Or, it may be able to configure RSs (sequences) orthogonal to each other by differently allocating a code (e.g., OCC), a scrambling seed (e.g., ID), a cyclic shift, a root index, and the like applied to an RS (sequence).

Meanwhile, in order to more flexibly manage a DL/UL resource in a new RAT situation, it may consider a method of directly indicating HARQ-ACK transmission timing corresponding to DL data reception via a DL scheduling grant. For example, if minimum delay between DL data and HARQ-ACK corresponds to the Dm number of SFs and a HARQ-ACK delay value indicated via a DL grant corresponds to the Dg (or Dm+Dg) number of SFs, time as much as the (Dm+Dg) number of SFs can be determined as actual delay between the DL data and the HARQ-ACK (Dg=0, 1, . . . ). Meanwhile, for clarity, if it is assumed that a UL CCE for transmitting HARQ-ACK corresponding to the total DL data scheduling for a single SF (e.g., linked with the total DL grant transmission resources or the total DL data transmission resources configured/set to a single SF) or a UC-CH resource amount corresponds to N, a UL CCE or a UC-CH resource index, which is determined by adding an offset corresponding to (Dg*N) to a DL grant transmitted in an SF # k, a UL CCE implicitly determined from a DL data transmission resource, or a UC-CH resource index, can be allocated as a final HARQ-ACK (i.e., A/N) transmission resource in an SF #(k+Dm+Dg) corresponding to the DL data. For example, a UL CCE or a UC-CH resource index can be provided as follows.

UL resource index=$n_{DL}$+Dg*N+M

In this case, a UL resource index denotes a (starting) UL CCE or a UC0CH resource index, $n_{DL}$ denotes a DL grant transmission resource or a DL data transmission resource, and M denotes an offset value configured by higher layer. The $n_{DL}$ may correspond to a first CCE index for transmitting a DL grant or a first PRB (Physical Resource Block) index for transmitting DL data.

Meanwhile, if the number of types of an A/N delay value capable of being possessed by Dg corresponds to Nd (e.g., Dg=0, 1, Nd−1), A/N payload (codebook) transmitted via a UL control/data channel in an SF # n can be configured by the Nd number of A/N responses in response to DL data received in the Nd number of SFs corresponding to an SF #(n−Dm−Dg). In this case, Opt 1) the Nd number of A/N responses are all transmitted using a specific UL CCE or a UC-CH resource index or Opt 2) an A/N response can be individually transmitted in response to DL data received in an SF using a DL grant in an SF #(n+−Dm−Dg), a UL CCE linked with a DL data transmission resource, or a UC-CH resource index. In particular, in case of the Opt 2, an A/N response can be individually transmitted in response to a single DL data received in the Nd number of SFs by mapping the A/N response to a DL grant in the Nd number of SFs, a UL CCE linked with a DL data transmission resource, or a UC-CH resource index, respectively. In other word, A/N responses are transmitted in response to DL data received in the Nd number of SFs using the Nd number of UL CCEs or UC-CH resource indexes. A/N response is mapped to each of the UL CCEs or the UC-CH resource indexes in response to DL data received in a single SF. A/N response can be mapped to a different UL CCE or a different UC-CH resource index in response to DL data received in a different SF. In this case, when A/N responses are carried via the Nd number of UL CCEs or UC-CH resource indexes in response to DL data received in the Nd number of SFs, the UL CCEs or the UC-CH resource indexes can be allocated/transmitted in a different SF or the same SF. Or, a part of the UL CCEs or the UC-CH resource indexes can be allocated/transmitted in the same SF and the rest of the UL CCEs or the UC-CH resource indexes can be allocated/transmitted in a different SF. In the foregoing description, a UL CCE or a UC-CH resource can be allocated by an explicit resource indicated by higher layer signaling (e.g., RRC signaling) and/or a DL grant (without a separate link with a DL grant or a DL data transmission resource).

Meanwhile, in Opt 2, if DL data transmission is actually scheduled to a specific part (e.g., Ns number of SFs (Ns<Nd)) only among the Nd number of SFs, it is able to individually transmit A/N response in response to DL data received in the Ns number of SFs using the Ns number of UL CCEs or UC-CH resource indexes only respectively linked with a DL grant or a DL data transmission resource in the Ns number of SFs. On the contrary, in case of Opt 1, although DL data transmission is actually scheduled to a partial SF only among the Nd number of SFs (i.e., irrespective of the number of DL data scheduling SFs), it may be able to always transmit A/N response in response to the whole of the Nd number of SFs. In this case, the UL CCE or the UC-CH resource can be allocated by an explicit resource indicated by higher layer signaling (e.g., RRC signaling) and/or a DL grant (without a separate link with a DL grant or a DL data transmission resource).

And, in order to more flexibly manage a DL/UL resource in a new RAT situation, it may consider a method of directly indicating UL data transmission timing corresponding to a UL scheduling grant via the UL grant. For example, if minimum delay between a UL grant and UL data corresponds to the Um number of SFs and a UL data transmission delay value indicated via the UL grant corresponds to Ug (or Um+Ug) number of SFs, time as much as the (Um+Ug) number of SFs can be determined as actual delay between the UL grant and the UL data (Ug=0, 1, . . . ). Um and Dm (i.e., minimum delay between DL data and HARQ-ACK) may vary depending on a UE according to DL/UL signal transmission/reception processing capability. A UE can report information on Um and/or Dm to a base station (e.g., via a specific UL transmission (e.g., transmission of Msg3 corresponding to RAR reception) in an initial access stage)).

And, it may consider a method of directly indicating CSI measurement and report timing via specific DCI signaling. For example, if minimum delay between CSI measurement timing and CSI feedback reporting timing corresponds to the Cm number of SFs and a CSI reporting delay value indicated via DCI corresponds to Cg (or Cm+Cg) number of SFs, time as much as the (Cm+Cg) number of SFs can be determined as actual delay between the CSI measurement timing and the reporting timing (Cg=0, 1, . . . ). A Cm value may vary depending on a UE according to DL/UL signal transmission/reception processing capability. A UE can report Cm information to a base station (e.g., via a specific UL transmission (e.g., transmission of Msg3 corresponding to RAR reception) in an initial access stage)).

And, it may consider a method of directly indicating aperiodic SRS transmission timing via specific DCI signaling. For example, if minimum delay between DCI transmission timing and SRS transmission timing corresponds to the Sm number of SFs and an SRS transmission delay value indicated via DCI corresponds to Sg (or Sm+Sg) number of SFs, time as much as the (Sm+Sg) number of SFs can be determined as actual delay between the DCI transmission timing and the SRS transmission timing (Sg=0, 1, . . . ). An Sm value may vary depending on a UE according to UL signal transmission processing capability. A UE can report Sm information to a base station (e.g., via a specific UL transmission (e.g., transmission of Msg3 corresponding to RAR reception) in an initial access stage)).

And, it may consider a method of directly indicating PRACH transmission timing via specific DCI signaling (e.g., PDCCH order). For example, if minimum delay between DCI transmission timing and PRACH transmission timing corresponds to the Pm (or Pm+Pg) number of SFs and a PRACH transmission delay value indicated via DCI corresponds to Pg number of SFs, time as much as the (Pm+Pg) number of SFs can be determined as actual delay between the DCI transmission timing and the PRACH transmission timing (Pg=0, 1, . . . ). A Pm value may vary depending on a UE according to UL signal transmission processing capability. A UE can report Pm information to a base station (e.g., via a specific UL transmission (e.g., transmission of Msg3 corresponding to RAR reception) in an initial access stage)).

Meanwhile, in case of a DCI format detected via a CSS for transmitting a UE-common DL control channel or a TM-common DCI format (e.g., DCI format 0/1A of LTE) commonly set to all DL/UL transmission modes (i.e., TM), it is preferable not to change a content/field configuration of the DCI format during an RRC reconfiguration period that changes a transmission/reception resource, a mode, and the like of a UE. Hence, Case #1) HARQ delay (e.g., delay between DL data scheduled from a DCI-based DL grant and HARQ-ACK, delay between DCI-based UL grant DCI and UL data) corresponding to the DCI detected via the CSS or the TM-common DCI can be fixed by a specific value. On the contrary, Case #2) in case of HARQ delay corresponding to DCI detected via USS or TM-dedicated DCI (e.g., DCI format 2C/4 of LTE) specifically set to each TM, it may be able to apply a method of indicating one of a plurality of delay values via DCI. As a different method, while a method of indicating one of a plurality of HARQ delay values using DCI is applied to the Case #1, a combination of a plurality of the delay values is always fixed. On the contrary, in case of the Case #2, a combination of a plurality of HARQ delay values can be reconfigured (via RRC signaling).

Meanwhile, HARQ delay which is applied in response to DL/UL data transmission based on CSS-based DCI or TM-common DCI or HARQ delay which is applied in response to transmission of specific DL/UL data (e.g., Msg3 scheduled from RAR or Msg4 scheduled for contention resolution) accompanied with an (initial) random access procedure can be always defined by a specific fixed value (without reconfiguration with a different value). And, HARQ delay which is applied before a UE reports minimum HARQ delay (e.g., Dm or Um) information according to processing capability of the UE to a base station or HARQ delay which is applied before (initial) configuration is performed on a HARQ delay value to be applied by a UE can also be always defined by a specific fixed value (without reconfiguration with a different value). This default HARQ delay can be designated/defined by minimum HARQ delay implemented/regulated based on processing capability of a specific UE category (type) or a value calculated based on the minimum HARQ delay. In this case, the specific UE category (type) corresponds to a UE category (type) supporting the lowest maximum (peak) data rate and/or the narrowest maximum operation (RF) band among a plurality of UE categories (types) different from each other supporting the maximum (peak) data rate equal to or greater than a specific level and/or the maximum operation (RF) band equal to or greater than a specific value.

Meanwhile, when a UC-CH resource is allocated to transmit periodic UCI such as periodic CSI, SR, and the like, 1) if a start UL CCE index (hereinafter, a start CCE) and a UC-CH configuration CCE number (hereinafter, a CCE aggregation level (AL)) are configured, the UC-CH resource is configured by the AL number of CCE indexes consecutive from the start CCE. Or, 2) if a start CCE, CCE AL, and a gap (hereinafter G) between CCEs are configured, the UC-CH resource can be configured by the AL number of CCE indexes having G gap from the start CCE. The CCE AL can be differently configured according to a UCI type (e.g., CSI or SR) and/or a CSI type (e.g., RI or PMI/CQI). For example, CCE AL of an SR can be configured to be smaller than CCE AL of CSI in consideration of a UCI type. And, CCE AL of an RI can be configured to be smaller than CCE AL of PMI/CQI in consideration of a CSI type.

And, when a UC-CH resource is allocated to transmit aperiodic UCI such as

HARQ-ACK, and the like, in response to DL data (e.g., PDSCH) reception, 1) a UL CCE index (hereinafter, a linked CCE) linked with a DL control channel transmission resource (e.g., DL CCE index) carrying DL grant DCI can be used as a UC-CH resource (e.g., linked CCE=DL CCE index+Offset (including 0), 2) if a linked CCE and CCE AL are provided, a UC-CH resource can be configured by the AL number of CCE indexes consecutive from the linked CCE, or 3) if a linked CCE, CCE AL, and G are provided, a UC-CH resource can be configured by the AL number of CCE indexes having G gap from the linked CCE. The CCE AL and/or the G can be indicated via DL grant DCI (e.g., PDCCH) and a linked CCE index can be replaced with a CCE index that a specific offset is added to the linked CCE index (i.e., linked CCE+offset). In this case, a UL CCE corresponding to the linked CCE can be allocated by an explicit resource indicated via higher layer signaling (e.g., RRC signaling) and/or a DL grant (without a separate link with a DL grant transmission resource).

Meanwhile, when a plurality of UCI transmission timings are the same (e.g., same SF), 1) if UC-CH resources (e.g., UL CCE indexes) carrying a plurality of UCIs are overlapped, UCI having a high priority (e.g., HARQ-ACK> (periodic) CSI) can be transmitted only (i.e., the remaining UCI transmission is omitted/dropped), 2) if UC-CH resources (e.g., UL CCE indexes) carrying a plurality of UCIs are not overlapped, a plurality of the UCIs can be transmitted at the same time (e.g., same SF).

Meanwhile, when an SRS resource is allocated to periodically transmit an SRS, 1) if a start CCE and CCE AL are configured, the SRS resource can be configured by the AL number of CCE indexes consecutive from the start CCE. Or, 2) if a start CCE, CCE AL, and G are configured, the SRS resource can be configured by the AL number of CCE indexes having G interval from the start CCE. In addition, it is able to configure a start CCE offset (hereinafter, CO) for frequency hopping (FH) of an SRS transmission band as well as an SRS transmission period. In particular, FH of SRS transmission can be performed in a manner that a CCE index as much as a CO is added to a start CCE that configures an SRS resource in every SRS transmission period. Additionally, it may be able to allocate an RE index and/or an OCC code sequence (e.g., Cn) to be used as an actual SRS transmission resource (used for mapping an SRS signal/sequence) in a CCE resource configured by the method above.

And, when an SRS resource is allocated to aperiodically transmit an SRS, 1) a CCE linked with a DL control channel transmission resource (e.g., DL CCE index) carrying SRS triggering DCI indicating SRS transmission can be used as an SRS resource (e.g., linked CCE=DL CCE index+offset (including 0)), 2) if a linked CCE and CCE AL are provided, the SRS resource can be configured by the AL number of CCE indexes consecutive from the linked CCE, or 3) if a linked CCE, CCE AL, and G are configured, the SRS resource can be configured by the AL number of CCE indexes having G interval from the linked CCE. The CCE AL and/or the G can be indicated via SRS triggering DCI. A linked CCE index can be replaced with a CCE index to which a specific offset is added (i.e., linked CCE+offset). And, an RE index and/or an OCC code sequence (e.g., Cn) to be used as an actual SRS transmission resource (used for mapping an SRS signal/sequence) in a CCE resource configured/determined by the method above can be allocated/indicated via higher layer signaling (e.g., RRC signaling) or SRS triggering DCI. In this case, a UL CCE corresponding to a linked CCE can be allocated by an explicit resource indicated via higher layer signaling (e.g., RRC signaling) and/or a DL grant (irrespective of a separate link with a DL grant transmission resource).

Meanwhile, when SRS transmission timing and UCI transmission timing are the same (e.g., same SF), 1) if an SRS resource and a UC-CH resource (e.g., UL CCE index) carrying UCI (e.g., UL CCE index) are overlapped, UCI can be transmitted only (i.e., SRS transmission is omitted/dropped), 2) if an SRS resource and a UC-CH resource (e.g., UL CCE index) carrying UCI are not overlapped, SRS and UCI can be transmitted at the same time (e.g., same SF).

Meanwhile, the present invention can be applied not only to 1) UL control channel configuration based on OFDM modulation but also to 2) UL control channel configuration based on SC-FDM modulation. In particular, in the present invention, an RE (index) may correspond to 1) a frequency (e.g., subcarrier) index of an IFFT input end (a front-end of 404 or 403 in FIG. 4) in an OFDM scheme or 2) a virtual frequency (e.g., virtual subcarrier) index of a DFT input end in an SC-FDM scheme (a front-end of 402 in FIG. 4). And, in case of the SC-FDM scheme (or, irrespective of a UL signal modulation scheme), R set or D set applied to a single code sequence (e.g., Cn) can be configured by a specific sequence (e.g., CAZAC (Constant Amplitude Zero Auto-Correlation) sequence). In this case, it may use/allocate a different cyclic shift value to identify UCI transmissions of a plurality of UEs different from each other and/or a different UCI bit transmission of the same UE. And, a UL CCE configuration/UCI signal mapping method of the present invention can be similarly applied not only to UL control channel configuration/transmission but also to DL CCE configuration/DCI signal mapping for DL control channel configuration/transmission.

Meanwhile, in the present invention, RS RE sets constructing a UC-CH or a sequence mapped/transmitted to a data RE set can be individually generated according to a UL CCE (the number of RS REs belonging to a single CCE or a length corresponding to the number of data REs). In particular, the RS RE sets constructing a single UC-CH or the data RE set can be configured by a single sequence (when a UC-CH is configured by a single CCE) or a plurality of sequences (when a UC-CH is configured by a plurality of CCEs). In this case, for example, the sequence may correspond to a ZC (Zadoff-Chu) sequence or a CAZAC sequence (for clarity, it is referred to as ZC sequence) used for a UL RS (e.g., SRS). Or, the sequence may correspond to a PR (Pseudo Random) sequence or a Gold sequence (for clarity, it is referred to as PR sequence) used for a DL RS (e.g., CRS).

Flexible UL Control Channel Structure Based on Resource Ratio Between Data and RS When a receiving end transmits HARQ-ACK in response to a data packet transmitted by a transmitting end, a method of designing a HARQ-ACK channel with an optimized structure according to a service attribute, a channel status, and the like is proposed. In cellular communication, in case of DL, a transmitting end corresponds to a base station and a receiving end corresponds to a UE. In case of UL, a transmitting end corresponds to a UE and a receiving end corresponds to a base station. In D2D (device-to-device) communication, a transmitting end corresponds to one UE and a receiving end corresponds to another UE. It is necessary for a wireless communication system to provide wireless communication services of various types. Each of the wireless communication services requires a different level of reliability and latency. For example, since such a service as web browsing requires reliability of a relatively low level, if efficiency is lowered to improve reliability of the HARQ-ACK channel, it is not preferable. On the contrary, in case of a service requiring high reliability and low-latency such as a vehicle control signal to be transmitted to an autonomous driving vehicle, since reliability of HARQ-ACK is very important, it is preferable to maximize reliability. In particular, when an error rate of a data packet transmission generally considered in a communication system corresponds to $10^{-1}$, although an error rate of HARQ-ACK becomes $10^{-3}$, a probability of not performing retransmission by a transmitting end under the assumption that a receiving end succeeds in receiving a data packet, which is not received by the receiving end, becomes $10^{-4}$. This may exceed an error rate $10^{-5}$ corresponding to reliability necessary for overall system.

In order to meet the requirements of various communication services, the present invention proposes a configuration of a HARQ-ACK channel, i.e., a structure for controlling an amount of resources and a volume of reference signals. The structure can be controlled according to a communication status as well as the service requirements. For example, a fast moving receiving end may use more resources as reference signal to track a fast channel change.

Figure 14:
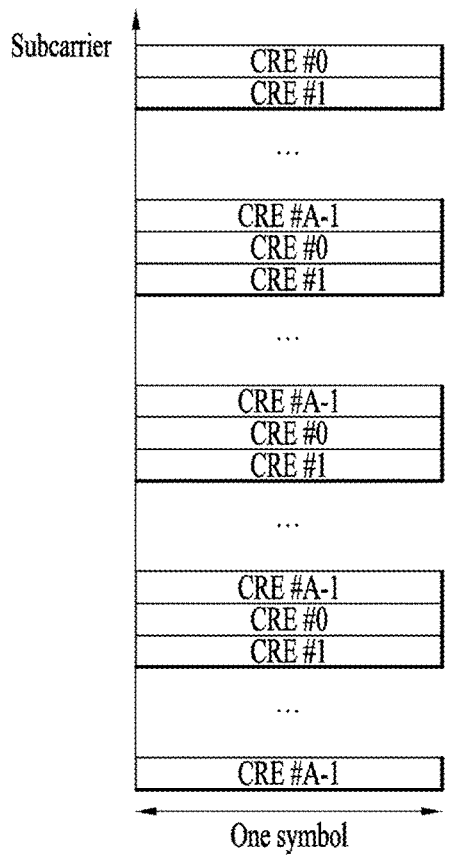
FIGS. 14 and 15 illustrate resources capable of transmitting a HARQ-ACK channel
Figure 15:
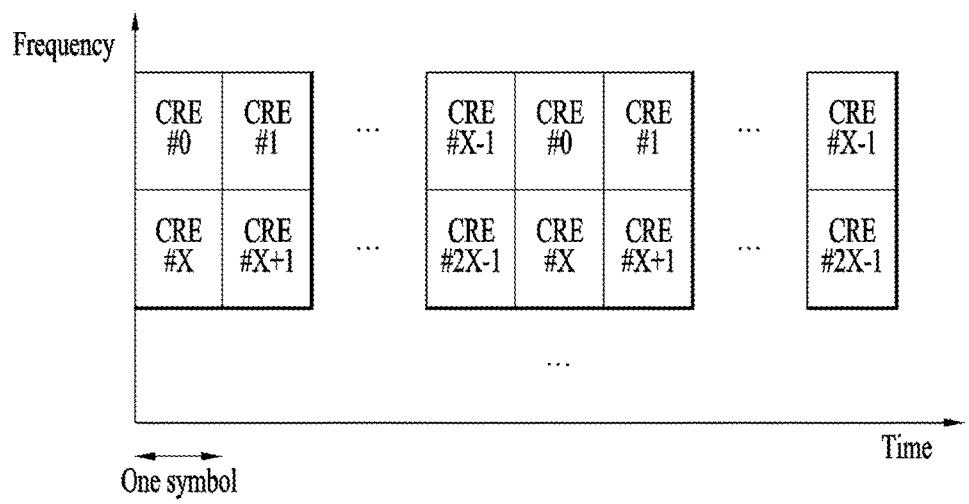

First of all, resources capable of transmitting a HARQ-ACK channel are divided into a plurality of resource sets and each of a plurality of resource sets is referred to as a CRE (Control Resource Element). Time/frequency resources constructing a single CRE can be contiguous in time/frequency domain or can be separated from each other with a certain interval in time domain or the frequency domain. FIG. 14 illustrates a case that one symbol (e.g., OFDMA symbol) is configured as a HARQ-ACK resource and each CRE is configured by a set of subcarriers separated from each other with a prescribed interval. FIG. 15 illustrates a case that a series of subcarriers on consecutive symbols (e.g., OFDMA symbol) are configured as a HARQ-ACK resource and each CRE uses symbols separated from each other with a prescribed interval.

When an individual HARQ-ACK is transmitted, a base station can configure the number of CREs and a method of using CREs used for transmitting the HARQ-ACK. In case of DL, a configuration of a HARQ-ACK channel to be transmitted by a UE is configured by a base station. The configuration of the HARQ-ACK channel can be configured by the number of CREs constructing the HARQ-ACK channel and a ratio of reference signal. For example, when a HARQ-ACK channel is configured using consecutive CRE indexes, if two CREs are configured by a ratio of reference signal 50%, a reference signal is transmitted in the first CRE constructing the HARQ-ACK channel and HARQ-ACK information can be transmitted in the second CRE. When CREs are used as reference signal, it is preferable to distribute the CREs to the entire CREs as uniform as possible. For example, when a HARQ-ACK channel is configured by A number of CREs, if B number of CREs are used as reference signal, the B number of CREs are sequentially indexed from 0. Then, a CRE of an index determined by an equation in the following can be used as a reference signal.

$$-F(n*A/B)+Y, \text{ or } [F(n*A/B)+Y]\bmod A$$

In this case, F(X) may correspond to a floor function or a ceiling function that makes X to be an integer and Y corresponds to an offset value. n=0, 1, . . . , B−1 and mod corresponds to a modulo function.

A method for a base station to configure a configuration (e.g., number of CREs or a ratio of reference signal) of a HARQ-ACK channel can be performed using one of methods described in the following or a combination of the methods.

A configuration of a HARQ-ACK channel to be used by a specific UE is configured in advance via higher layer signaling such as RRC.

A HARQ-ACK channel configuration corresponding to a data packet is designated via a physical layer signal (e.g., PDCCH, DCI, L1 control signal) that forwards a scheduling message.

A HARQ-ACK channel configuration to be used by each HARQ process ID is configured in advance.

A HARQ-ACK channel configuration is determined according to the number of bits constructing a data packet. For example, a HARQ-ACK channel is configured using the relatively small number of CREs and a reference signal of a high ratio for a data packet equal to or less than a prescribed size. If a data packet is greater than the prescribed size, a HARQ-ACK channel is configured using the relatively large number of CREs and a reference signal of a low ratio.

A HARQ-ACK channel is configured according to an amount of information (e.g., number of ACK/NACK bits) multiplexed by a single HARQ-ACK channel. For example, a HARQ-ACK channel is configured using the relatively small number of CREs and a reference signal of a high ratio for an amount of information equal to or less than a prescribed size. If an amount of information is greater than the prescribed size, a HARQ-ACK channel is configured using the relatively large number of CREs and a reference signal of a low ratio.

Meanwhile, a specific HARQ-ACK channel can be configured to be used by all CREs as a reference signal. In this case, whether or not a receiving end succeeds in performing decoding can be determined (by a transmitting end) according to whether or not a reference signal is transmitted in a corresponding CRE. For example, if the receiving end fails to receive a data packet, the receiving end transmits no signal to a corresponding CRE. On the other hand, if the receiving end succeeds in receiving a data packet, the receiving end can transmit a reference signal to a corresponding CRE. According to the operation above, since the receiving end does not additionally indicate whether or not a control channel for scheduling a data packet is received, it is able to reduce the number of all available feedback combinations, thereby increasing HARQ-ACK reception performance. If the receiving end distinguishes ACK from NACK via a HARQ-ACK channel, it is necessary for a transmitting end to determine a third state (i.e., Discontinuous Transmission (DTX)) that the receiving end fails to receive a message and transmits no signal in addition to the two states. However, if the HARQ-ACK channel configuration is used, since it is necessary for the transmitting end to distinguish ACK from DTX only, it is able to more stably receive a HARQ-ACK channel. In particular, if DTX is identified on a HARQ-ACK channel, retransmission is performed.

When wireless communication is performed according to the present invention, if a packet error or a link failure occurs, a configuration of a HARQ-ACK channel necessary for restoring the packet error or the link failure can be optimized according to a situation. In the present invention, HARQ-ACK can be generalized by UCI (e.g., HARQ-ACK, aperiodic/periodic C SI, SR. etc.).

Figure 16:
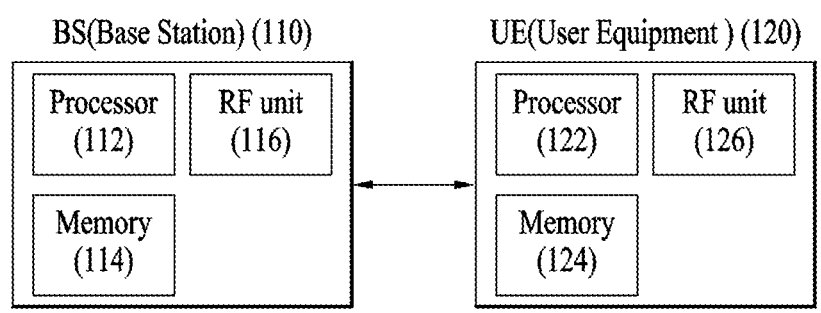
FIG. 16 illustrates a base station and a terminal that can be applied to the present invention.

FIG. 16 illustrates a BS and a UE of a wireless communication system, which are applicable to embodiments of the present invention.

Referring to FIG. 16, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

What is claimed is:

1. A method of performing communication by a user equipment (UE) in a wireless communication system, the method comprising:
   generating Uplink Control Information (UCI) and a demodulation reference signal (RS);
   mapping the UCI and the demodulation RS to at least one group of resource elements (REs) in a single Orthogonal Frequency Division Multiplexed (OFDM) symbol duration; and
   transmitting the UCI mapped to the at least one group of REs,
   wherein each of the at least one group of REs comprises twelve contiguous REs including (i) demodulation RS transmission REs, and (ii) UCI transmission REs, and
   wherein, within each of the least one group of REs, each of the demodulation RS transmission REs are spaced apart from each other by only two contiguous UCI transmission REs.

2. The method of claim 1, wherein the UCI contains Hybrid Automatic Repeat reQuest Acknowledgement (HARQ-ACK) for downlink data.

3. The method of claim 1, wherein the UCI contains Channel State Information (CSI), and
   wherein the at least one group of REs in the single OFDM symbol duration are configured according to whether the CSI is Rank Indication (RI) or Channel Quality Information/Precoding Matrix Indicator (CQI/PMI).

4. The method of claim 1, wherein symbols of the UCI are Code Division Multiplexed (CDM) using an Orthogonal Cover Code (OCC).

5. The method of claim 1, wherein the twelve REs in each of the at least one group of REs during the single OFDM symbol duration comprise: (i) four demodulation RS transmission REs and (ii) eight UCI transmission REs.

6. The method of claim 1, wherein, among the twelve REs in each of the at least one group of REs in the single OFDM symbol duration:
   at least one UCI transmission RE is arranged after the last demodulation RS transmission RE.

7. The method of claim 1, wherein, among the twelve REs in each of the at least one group of REs in the single OFDM symbol duration, a ratio of a number of demodulation RS transmission REs to a number of UCI transmission REs is 1:2.

8. The method of claim 1, wherein the at least one group of REs in the single OFDM symbol duration comprises a plurality of groups of REs, and
   wherein, within the plurality of groups of REs, demodulation RS transmission REs are spaced apart from each other by two UCI transmission REs.

9. The method of claim 1, wherein mapping the UCI and the demodulation RS to the at least one group of REs comprises mapping the UCI and the demodulation RS to the at least one group of REs in a frequency domain.

10. The method of claim 1, wherein the twelve REs in each of the at least one group of REs in the single OFDM symbol duration are consecutively indexed, and wherein, among the twelve REs in each of the at least one group of REs in the single OFDM symbol duration:

the demodulation RS transmission REs comprise (i) a first demodulation RS transmission RE having a first index number and (ii) a second demodulation RS transmission RE having a second index number, wherein a difference between the second index number and the first index number is equal to 3.

11. A user equipment (UE) configured to communicate in a wireless communication system, the UE comprising:

an Radio Frequency (RF) module;

at least one processor; and at least one computer memory operably connectable to the at least one processor and storing instructions that, when executed, cause the at least one processor to perform operations comprising:

generating Uplink Control Information (UCI) and a demodulation reference signal (RS);

mapping the UCI and the demodulation RS to at least one group of resource elements (REs) in a single Orthogonal Frequency Division Multiplexed (OFDM) symbol duration; and transmitting, by the RF module, the UCI mapped to the at least one group of REs, wherein each of the at least one group of REs comprises twelve contiguous REs including (i) demodulation RS transmission REs, and (ii) UCI transmission REs, and wherein, within each of the least one group of REs, each of the demodulation RS transmission REs are spaced apart from each other by only two contiguous UCI transmission REs.

12. The user equipment of claim 11, wherein the UCI contains Hybrid Automatic Repeat reQuest Acknowledgement (HARQ-ACK) for downlink data.

13. The user equipment of claim 11, wherein the UCI contains Channel State Information (CSI), and wherein the at least one group of REs in the single OFDM symbol duration are configured according to whether the CSI is Rank Indication (RI) or Channel Quality Information/Precoding Matrix Indicator (CQI/PMI).

14. The user equipment of claim 11, wherein symbols of the UCI are Code Division Multiplexed (CDM) using an Orthogonal Cover Code (OCC).

15. The user equipment of claim 11, wherein the twelve REs in each of the at least one group of REs during the single OFDM symbol duration comprise: (i) four demodulation RS transmission REs and (ii) eight UCI transmission REs.

16. The user equipment of claim 11, wherein, among the twelve REs in each of the at least one group of REs in the single OFDM symbol duration:

at least one UCI transmission RE is arranged after the last demodulation RS transmission RE.

17. The user equipment of claim 11, wherein, among the twelve REs in each of the at least one group of REs in the single OFDM symbol duration, a ratio of a number of demodulation RS transmission REs to a number of UCI transmission REs is 1:2.

18. The user equipment of claim 11, wherein the at least one group of REs in the single OFDM symbol duration comprises a plurality of groups of REs, and wherein, within the plurality of groups of REs, demodulation RS transmission REs are spaced apart from each other by two UCI transmission REs.

19. The user equipment of claim 11, wherein mapping the UCI and the demodulation RS to the at least one group of REs comprises mapping the UCI and the demodulation RS to the at least one group of REs in a frequency domain.

20. The user equipment of claim 11, wherein the twelve REs in each of the at least one group of REs in the single OFDM symbol duration are consecutively indexed, and wherein, among the twelve REs in each of the at least one group of REs in the single OFDM symbol duration:

the demodulation RS transmission REs comprise (i) a first demodulation RS transmission RE having a first index number and (ii) a second demodulation RS transmission RE having a second index number, wherein a difference between the second index number and the first index number is equal to 3.

* * * * *